United States Patent [19]

Jay

[11] Patent Number: 5,606,907
[45] Date of Patent: Mar. 4, 1997

[54] FOOD PROCESSING VAT

[75] Inventor: Jeffrey L. Jay, New Glarus, Wis.

[73] Assignee: Damrow Company, Fond du Lac, Wis.

[21] Appl. No.: 646,447

[22] Filed: May 7, 1996

Related U.S. Application Data

[63] Continuation-in-part of Ser. No. 444,066, May 18, 1995, Pat. No. 5,513,559.

[51] Int. Cl.$^6$ ............................... A01J 25/02; B01F 7/32
[52] U.S. Cl. ............................... 99/455; 99/453; 99/462; 241/98; 241/101.1; 366/149; 366/297
[58] Field of Search ........................ 99/452–466; 241/98, 241/101.1, 199.12; 366/149, 297–301, 325.8, 325.1, 328.2

[56] References Cited

U.S. PATENT DOCUMENTS

| | | | |
|---|---|---|---|
| 2,007,422 | 7/1935 | Damrow | 99/460 |
| 2,029,691 | 2/1936 | Robinson | 366/298 |
| 2,814,114 | 11/1957 | Nessler et al. | 99/463 |
| 3,545,533 | 12/1970 | Matsuoka | 366/149 |
| 3,733,702 | 3/1973 | Robertson et al. | 9/462 |
| 3,858,855 | 1/1975 | Hazen | 99/462 |
| 3,964,874 | 6/1976 | Maruko et al. | 366/149 |
| 3,988,011 | 10/1976 | Kressin | 366/297 |
| 4,050,369 | 9/1977 | Mulvihill | 99/463 |
| 4,206,880 | 6/1980 | Stanton | 99/462 |
| 4,321,860 | 3/1982 | Hazen | 99/453 |
| 4,612,853 | 9/1986 | Hauck | 366/299 |
| 4,752,139 | 6/1988 | Hauck | 366/299 |
| 4,776,703 | 10/1988 | Oda et al. | 366/297 |
| 4,938,504 | 7/1990 | Pittelko | 99/462 |
| 5,178,060 | 1/1993 | Rusch et al. | 99/453 |

Primary Examiner—Timothy F. Simone
Attorney, Agent, or Firm—Andrus, Sceales, Starke & Sawall

[57] ABSTRACT

A cheese processing vat of the type having a pair of interconnected wall portions each having a compound frustoconical shape, with agitator panels rotating therein to sweep volumes which correspond to the frustoconical wall portions, said agitator panels having radially inner edge portions spaced radially outwardly from the axis of panel rotation, and the axes of rotation of the two panels are spaced at a distance less than the radius of the volumes swept by the panels. In this manner, the overlap in the volumes swept by the respective panels permits the radially outer edge portion of one panel to pass through the normally quiescent space at and beyond the axis of rotation of the other panel. A unique divergent cutting blade orientation positions a framework of outwardly extending blades and intersecting longitudinally extending blades so that the blades are neither parallel to nor perpendicular to the axis of panel rotation. This provides beneficial cross cutting of the cheese mass during processing.

5 Claims, 4 Drawing Sheets

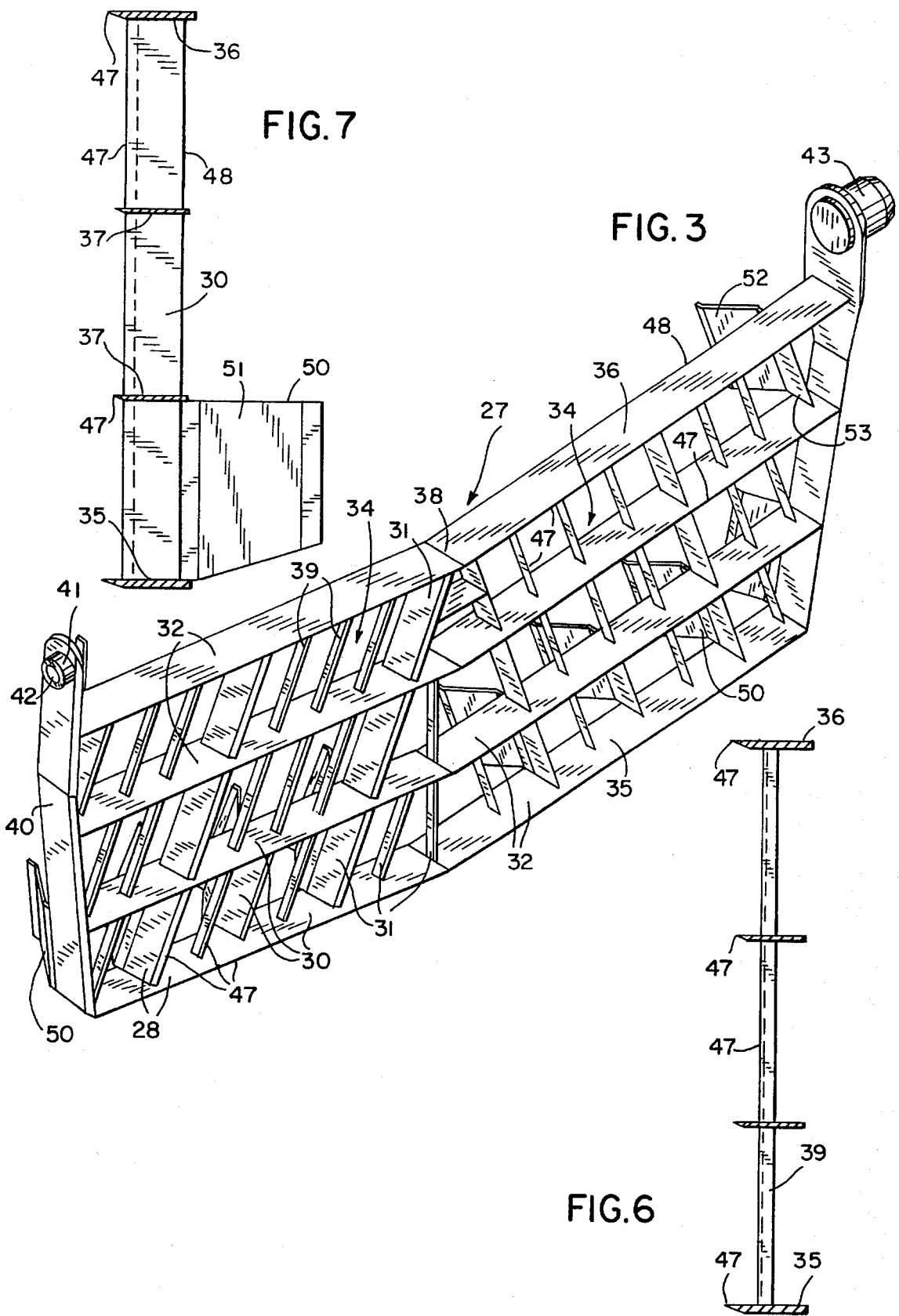

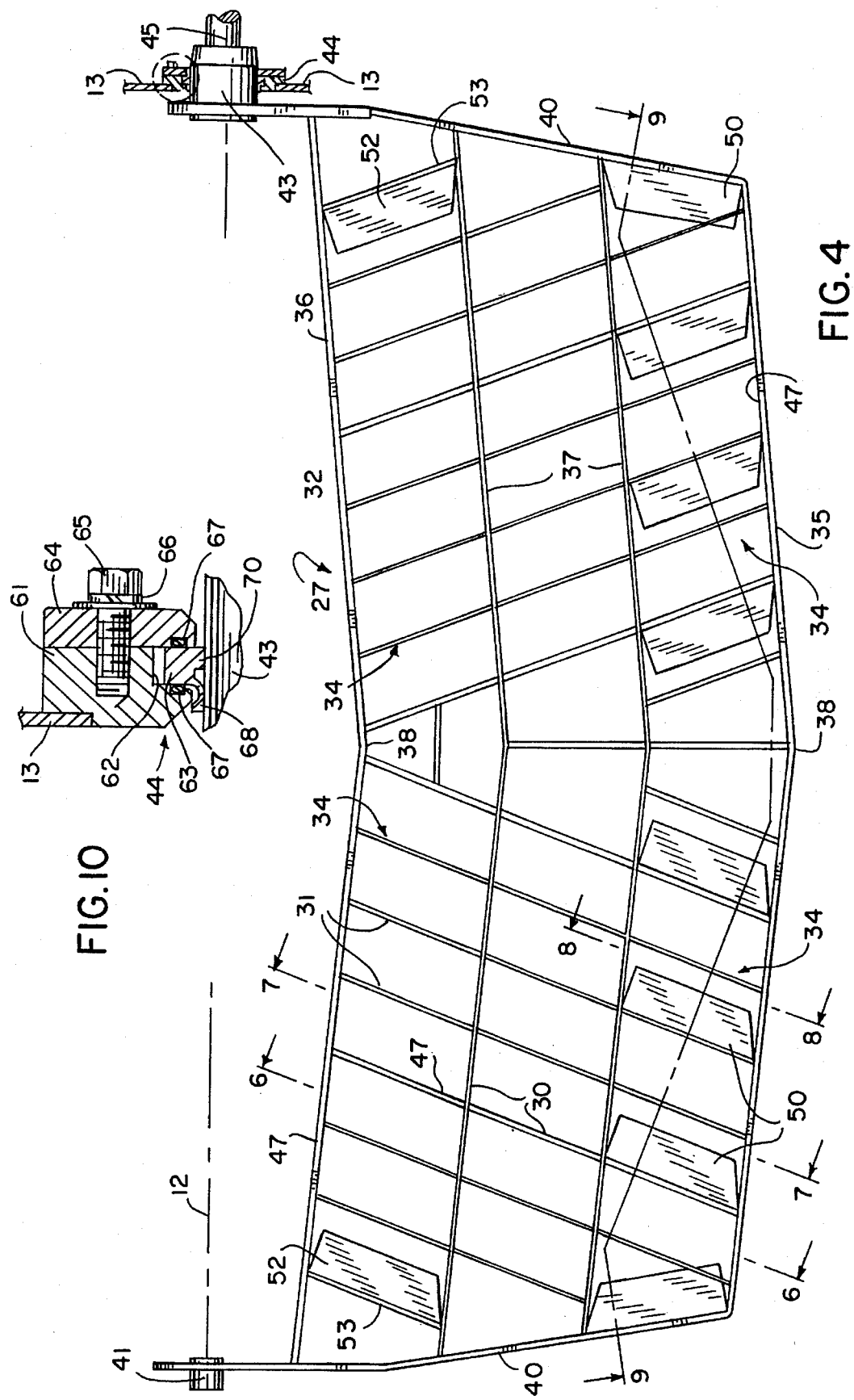

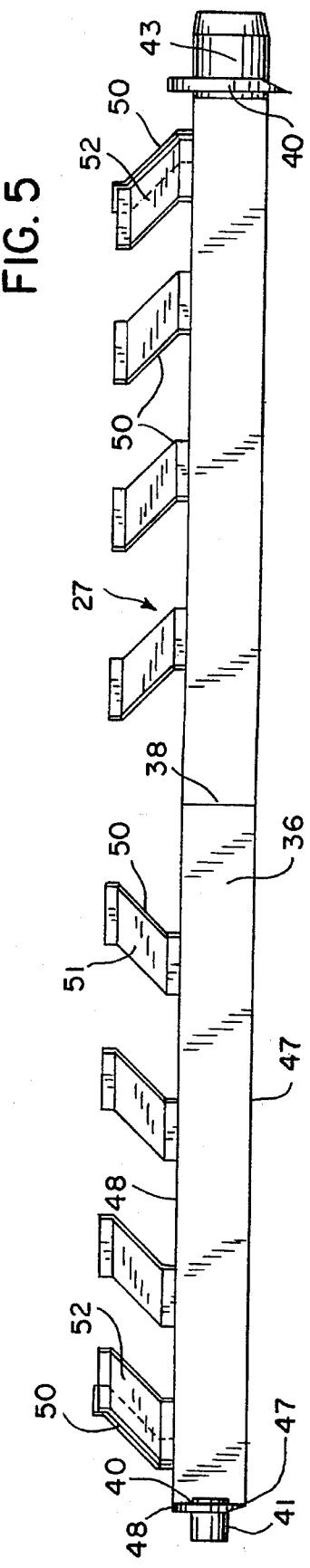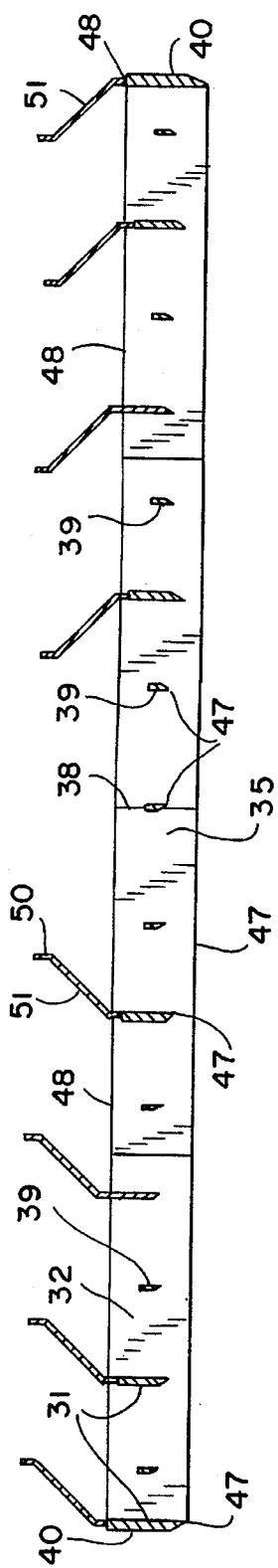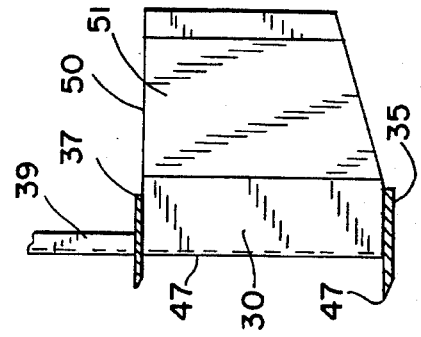

FOOD PROCESSING VAT

This is a continuation-in-part of application Ser. No. 08/444,066, filed May 18, 1995, now U.S. Pat. No. 5,513,559.

BACKGROUND OF THE INVENTION

The present invention relates generally to the field of food processing equipment and, more particularly, to a food processing vat for production and processing of semi-liquid food products, such as cheese. The food processing vat of the present invention is preferably comprised of a closed vessel arranged in a plurality of horizontally orientated, partial frustoconical sections, each section having a separate agitator means which allows maximum product yield to be obtained from the raw materials used.

The use of totally enclosed food processing vats, for the manufacture of many types of cheese and similar semi-liquid food products, is well known in the art. U.S. Pat. Nos. 3,858,855; 4,206,880; 4,938,424 and 5,178,060 are examples of prior art cheese making vats that are fully enclosed. The vats in each of these patents use agitator means, for cutting the coagulum and stirring, that are vertically disposed within a vessel comprised of two partial cylinders. This design is very effective for smaller vessels but becomes less efficient with increases in size due to the need to create vertical movement within the vat contents without generating damagingly high peripheral agitator speeds. In the patents cited above, vertical movement is induced by means of hinged deflector plates which cause maximum turbulence when the agitator is rotated in the stirring direction while maintaining a highly streamlined configuration when the agitator is rotated in the cutting direction.

U.S. Pat. No. 4,108,058 discloses a fully enclosed cheese making vat in the form of a horizontal cylindrical vessel with a single horizontal shaft carrying the combined cutting and stirring paddles. The construction of the agitator paddle results in less damage to the food product and, in the case of cheese, results in minimum release of butterfat and cheese fines into the whey. A major disadvantage of this design is that the whole contents of the vat tend to rotate during cutting and in effect move away from the knife blades. This, together with a very high velocity gradient between the agitator blades near to the shaft and those on the periphery, makes it very difficult to achieve an evenly cut coagulum and can cause problems of product variability.

U.S. Pat. No. 4,989,504 describes a fully enclosed cheese making vat in the form of a plurality of horizontally arranged partial cylindrical sections each with a separate shaft-mounted agitator, such that the distance between agitator shafts is greater than the radius of the swept volume created by the rotation of the agitator. This arrangement is an improvement over the single shaft horizontal vat with regard to rotation of the vat contents during cutting, but the problem of velocity gradient between the agitator paddle near to the shaft and that at the periphery is only slightly reduced. The low agitator speeds that are typically used with this type of food processing vat give rise to very poor agitation adjacent to the agitator shaft and can also cause a significant problem with product congealing around the shaft. The vat construction described in the above U.S. Pat. No. 4,989,504 includes an agitator comprising a series of individual paddles attached to the shafts in staggered rows or in a row wrapped spirally around the shafts. A resultant problem with this arrangement is the extreme difficulty encountered when entering the vat for maintenance or hand cleaning due to the impossibility of parking the agitator paddles in a position that allows easy and safe movement around the inside of the vat.

Although the designs listed above have proved adequate for processing many types of cheese products, modern commercial practice has generated more stringent compositional standards and the requirement for many customized products with special functional properties. Some of these functional properties result in significant production difficulties, especially where it is required to effect partial separation of solid from liquid while maintaining some degree of agitation to prevent the matting together of solid material that takes place if there is no agitation.

In order to achieve the required standard of operation, it would be advantageous to have a horizontal food processing vat that further reduced problems associated with velocity gradients across the agitator, that eliminated the requirement for horizontal shafts running through the center of the swept volumes and that permitted partial separation of solid from liquid during maintained agitation.

SUMMARY OF THE INVENTION

The present invention is directed to an enclosed food processing vat comprised of a horizontally oriented vat having two wall portions, each wall portion formed of axially interconnected frustoconical surface portions and comprising the first portion of a swept volume created by the rotation of an agitator about a horizontal axis.

The horizontal axis is disposed centrally within each wall portion, the distance between the axes being smaller than the radius of the swept volume created by rotation of the agitator means so that a second portion of the swept volume for each axis intersects and overlaps the swept volume of the adjacent axis. The vat is enclosed by a pair of flat end walls and common top and bottom walls. In the preferred embodiment, the wall portions each comprise a pair of intersecting truncated cones that have their maximum radius at, or near, the center of the vat allowing the contents of the vat to drain towards the center and eliminating the need to slope the vat towards an end outlet.

Each horizontal axis is provided with an agitator comprised of a single combined cutting and stirring panel carried on two support arms that extend radially from the axis. The support arms are positioned adjacent to the flat end walls, each of which arms is supported by a hub that is concentric with the axis. One hub is journaled in one end wall of the vat and the other hub is keyed to the stub shaft of an external drive extending through the other end wall. Each agitator panel is comprised of a series of blades arranged to provide an open framework of intersecting blades which do not need to be orthogonal and, preferably, are neither directly perpendicular to the axis nor directly parallel thereto. The innermost generally axially extending blade is mounted part way up and extends between the radial support arms, and is angularly disposed such that it forms a shallow V-shape with the apex of the V pointing radially outwardly. The outermost generally axially extending blade is arranged to run adjacent to the interconnected frustoconical surfaces forming the inner wall of the vat throughout part of its rotation. The outermost blade is also angularly shaped to form a shallow V similarly shaped and parallel to the innermost blade. Agitator panels are tapered in a radial direction and converge towards the periphery so that, when rotated co-directionally, the outer portion of each panel may pass between the radial support arms of an adjacent panel.

The blades are sharpened on one side only and fixed in such a way that, if the agitator means is rotated in one direction, the sharp edges will be presented to the food product and cutting will take place, whereas, if the agitator means is rotated in the opposite direction the blunt edges of the blades will be presented to the food product and stirring will take place. Stirring action is enhanced by provision of fixed deflector plates which generate turbulence when the agitator panel is rotated in the stirring direction while maintaining a sharp, streamlined profile when the agitator is rotated in the cutting direction.

The overall agitation pattern is such that the contents of the vat will be induced to rotate in the same direction as the agitator with the contents subjected to significant cross-cutting action and other interactions in the zone where the agitator panels overlap. The present invention allows rotation of product to be more easily induced than in food processing vats where through shafts dictate that the axes of rotation of adjacent agitators be spaced further apart than the radius of the swept volume. This is critical to effective control of the early stages of cutting the coagulum in cheese making and allows the agitators of the present invention to be operated at lower speeds, causing less product damage, than would otherwise be possible.

The velocity gradient between the inner and outer parallel knives is significantly reduced due to the elimination of the through shaft and radially inner paddle components. This also removes any tendency for accumulation of congealed product as the innermost axially extending knife moves at a velocity sufficient to prevent adhesion during all cutting and stirring operations. Where an agitator panel passes between the radial support arms of an adjacent agitator panel, the shear forces on the product are reduced because both panels and radial support arms are moving in the same direction, thus product damage is minimized. Agitator panels are driven by power applied to the hub from the stub shaft which extends through the end wall of the vat and is externally supported.

Product is retained within the vat by means of a hygienic seal between the end wall of the vat and the driven stub shaft. Agitators normally rotate co-directionally but can be arranged for counter rotation where specific production criteria demand it. Agitators can be operated in a reciprocating or oscillating mode at certain stages of production. The non-drive end of the agitator panel is supported by means of a hygienic internal bearing which engages the non-driven hub. An outer shell surrounds the parts of the inner wall sections which are below the normal level of product in the vat, and the shell is supported by a cradle structure for stabilizing the vat.

Heating or cooling of the contents of the vat can take place by means of the application of heating or cooling media to the space between the inner wall and the outer shell of the vat. Provision is made for filing and emptying the vat by means of suitable connection through the vat walls. Partial separation of solid material from liquid may be made by means of connections through the vat ends at various levels. If it is necessary to effect this separation while the contents are exposed to continuous agitation, the agitator may be set in reciprocating mode and a suction pipe and solids exclusion screen lowered into the vat from the top. Access to the inside of the vat, for inspection and maintenance, can be gained through a sealable opening in the top or end wall.

Accordingly, a primary objective of the present invention is to provide an enclosed food processing vat that maintains the highest level of protection against risk of external contaminants entering the food product, minimizes mechanical damage to the food product and allows maximum control of the food manufacturing process.

Another objective of the present invention is to provide an enclosed food processing vat having a plurality of horizontally disposed agitator paddles, without through shafts, that provide means for cutting and stirring the food product such that the velocity gradient across the agitator panel is minimized and, by eliminating the through shafts, collection of congealed product around the shafts is eliminated.

A further object of the present invention is to provide a food processing vat where partial separation of solid from liquid product can be undertaken while maintaining some agitation to prevent solids from matting together.

These and other objectives of the present invention will become apparent with reference to the drawings, the description of the preferred embodiment and the appended claims.

BRIEF DESCRIPTION OF THE DRAWINGS

FIG. 3 is a perspective view of one of the agitator panels of the present invention.

FIG. 4 is a top plan view of the agitator panel, also showing details of the rotary seal for the exterior driven stub shaft.

FIG. 5 is an inner end elevation of the agitator panel shown in FIG. 4.

FIG. 6 is a sectional view taken on line 6—6 of FIG. 4.

FIG. 7 is a sectional view taken on line 7—7 of FIG. 4.

FIG. 8 is a partial sectional view taken on line 8—8 of FIG. 4.

FIG. 9 is a sectional view through the agitator panel taken on line 9—9 of FIG. 4.

FIG. 10 is an enlarged detail of a portion of the rotary seal shown in FIG. 4.

Detailed Description of the Preferred Embodiment

Figure 1:
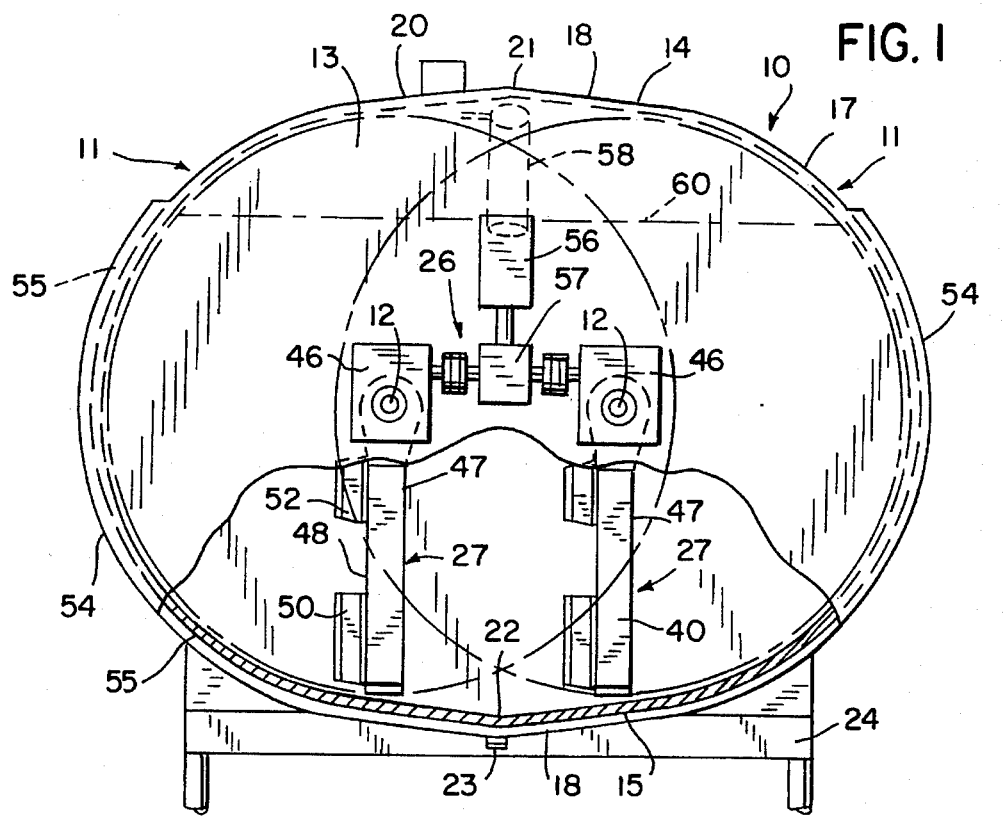
FIG. 1 is an end elevation of the processing vat of the present invention with a portion of one end wall broken away to show the agitator panels therein.
Figure 2:
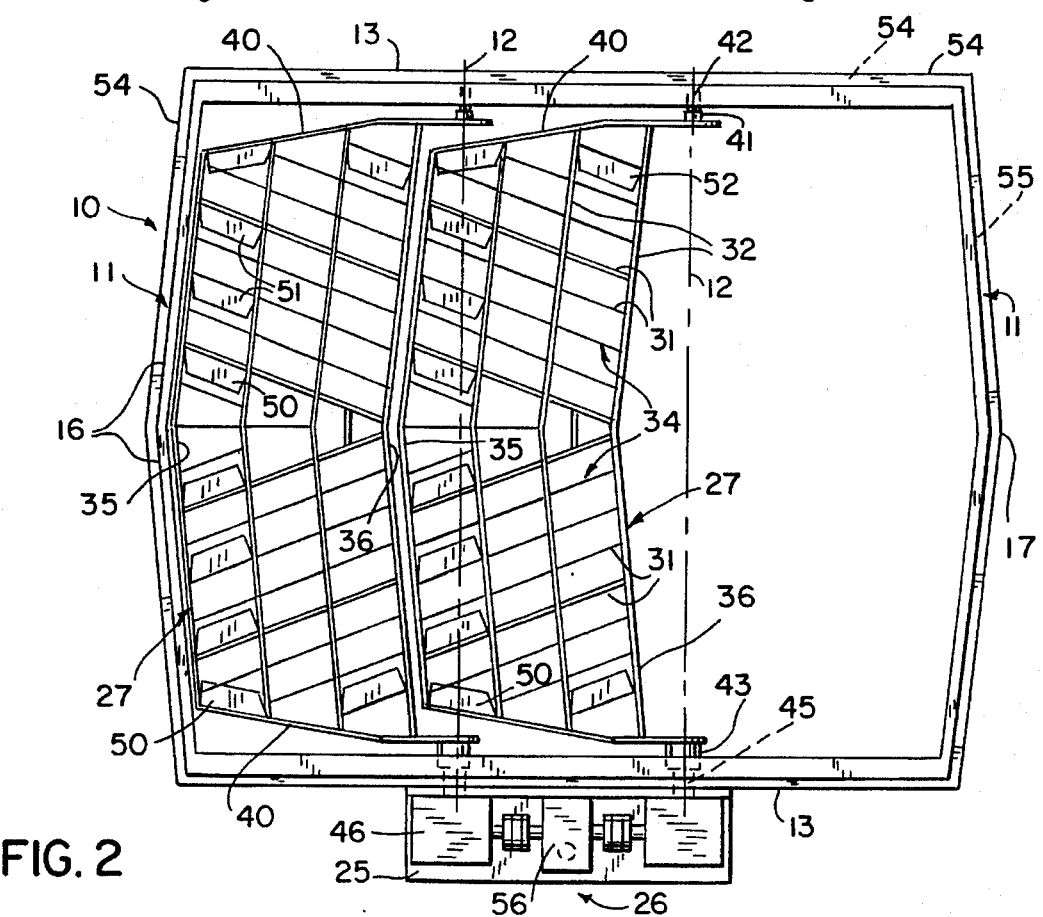
FIG. 2 is a horizontal sectional view through the processing vat shown in FIG. 1 with the agitator panels rotationally displaced 90° to show their interaction.

The food processing vat 10 of the present invention, as shown in FIGS. 1 and 2, is completely enclosed and is formed from a pair of curved wall portions 11 which are positioned with their longitudinal axes 12 disposed generally horizontally and in parallel horizontally spaced relation. The axial ends of the wall portions 11 are interconnected and enclosed by flat opposite end walls 13 and the surfaces of the wall portions 11 are interconnected with generally tangentially disposed upper and lower walls 14 and 15, respectively. Thus, the vat 10 has a generally oval cross section when viewed in a plane perpendicular to the axes 12.

In the preferred embodiment of the invention, each of the curved wall portions 11 is constructed of a pair of interconnected and oppositely extending frustoconical surface portions 16. The frustoconical surface portions are interconnected along a central circular apex 17 which lies in a plane perpendicular to the axes 12 and defines the region of maximum vat radius with respect to each of the axes 12.

Similarly, the upper wall 14 and lower wall 15 each comprise a pair of oppositely sloping planar wall portions 18 interconnected along abutting edges to form central linear ridges 20 interconnecting the circular apices 17 at the top and bottom of the vat. The wall portions 18 also preferably slope in the direction of the central linear ridge 20 to form central lateral ridges 21. This construction is particularly useful for the lower wall 15 where a central apex 22, formed at the intersection of the lower central linear ridge 20 and the lateral ridges 21, provides a convenient position for a drain outlet 23. The vat is mounted on a supporting frame 24 with the central drain outlet 23 establishing the lowermost point of the vat. The supporting frame 24 includes a side frame member 25 which supports a drive mechanism 26 for the vat, as will be described hereinafter.

Referring also to FIGS. 3 and 4, a pair of agitator panels 27 are rotatably mounted within the vat 10, each panel 27 having its rotational axis coincident with a horizontal axis 12 of one of the compound frustoconical wall portions 11. Each of the panels 27 is constructed of an open framework of intersecting blades 30 comprising generally flat plates 28. The blades include a number of parallel generally outwardly extending blades 31 and a number of parallel generally longitudinally extending blades 32 which are preferably arranged such that the blades 31 and 32 are respectively non-perpendicular. As shown, the framework of intersecting blades comprises primarily a plurality of frame segments of parallelogram shape. As best seen in FIGS. 2 and 4, the outwardly extending blades 31 are arranged in pairs of blade groups 34 with one of the groups positioned on each side of a central vertical plane perpendicular to the panel axis 12. The outwardly extending blades 31 of each blade group 34 are set at an acute angle to the vertical central plane and are mutually divergent in a radially outward direction.

The generally longitudinally extending blades 32 include an outermost blade 35 which comprises the radially outer edge of the agitator panel 27 and an innermost blade 36 which comprises the radially inner edge of the panel. A number of intermediate blades 37 are generally equally spaced between and parallel to the outermost and innermost blades 35 and 36.

To allow the rotating agitator panel 27 to sweep in closely spaced relation to the frustoconical surface portions 16 of each wall portion 11 of the vat, and also to provide the unique intersecting overlap of the respective volumes which are swept by the rotating agitator panels, the outermost and innermost blades 35 and 36, respectively, have a shallow V shape each of which defines a central blade apex 38 which points radially outwardly, allowing the outermost blade 35 to conform closely to the shape of the interior of the frustoconical surface portions 16.

Each agitator panel 27 includes a pair of radial support arms 40 by which the panel is mounted for rotation. One end of one of the support arms includes a first hub 41 rotatably supported by a bearing 42 on one of the flat end walls 13. The end of the other support arm 40 includes a second hub 43 which turns in a rotary seal 44 in the other end wall 13 and is rotatably supported by a stub shaft 45 extending from a right angle gear box 46 forming part of the drive mechanism 26 supported outside the end wall 13. The stub shaft 45 includes a suitable keyed driving connection to the hub 43. The opposite outer ends of the support arms 40 are secured to the opposite ends of the outermost blade 35.

The rotational axes 12 of the agitator panels 27 are spaced horizontally at a distance which is less than the radius of rotation (or the radius of the volume swept) by the panels as they rotate. Therefore, to prevent contact between the rotating panels, the innermost blade 36 is spaced radially from the rotational axis of panel by an amount sufficient to accommodate an overlap in the respective volumes swept by each panel as it rotates beyond the axis of the adjacent panel. As a result, the radially outer edge portion of one panel, defined by the position of the outermost blade 35, will pass during rotation through the space between the innermost blade 36 and rotational axis 12 of the other panel.

In a manner generally similar to prior art cheese processing vats, the agitator panel blades 30 are constructed to provide a cutting function when the panels are rotated in one direction and a stirring function when the panels are rotated in the opposite direction. Thus, each of the blades has a sharp cutting edge 47 on one side of the panel, which cutting edges are preferably coplanar, and a blunt stirring edge 48 on the other side of the panel, which stirring edges may be coplanar, but are not in the preferred embodiment. In order to provide adequate panel strength, the radial support arms 40 (which also are provided with cutting edges 47 and stirring edges 48), all of the generally longitudinally extending blades 32, and certain of the generally outwardly extending blades 31 are constructed of heavier plate material than the remaining intermediate radially extending blades 39. As best shown in FIGS. 3 and 9, the intermediate radial blades 39 are also narrower in depth and, as a result, have stirring edges 48 which are offset inwardly of the corresponding stirring edges of the blades 32. Nevertheless, all of the blades are provided with cutting and stirring edges.

The radially outer ends of alternate outwardly extending blades 31 and the outer ends of each radial support arm 40 include integral deflector plates 50 each of which includes a face portion 51 bent out of the plane of the blade on which it is formed and disposed at an acute angle with respect thereto. The deflector plates 50 extend from the stirring edge face of the agitator panel 27 and the free edges thereof are blunt in the same manner as the stirring edges 48. A pair of inner deflector plates 52 are also provided on shortened radial blades 53 mounted near the intersections of the radial support arms 40 and the opposite ends of the innermost blade 36.

It is important, when utilizing the food processing vat of the present invention to make cheese, to get the coagulated mass of curds and whey moving in a slow circulatory path under the influence of the rotating agitator panels 27, both rotating in the same direction with the cutting edges 47 leading. Low speed circulation of the coagulated mass, by rotating the agitator panels in the range of 1 to 2 rpm, is attained more rapidly in this horizontal vat construction, as compared to prior art devices such as those discussed above, because the axially extending ridge or apex defined by the juncture between the two cylindrical shells of prior art vats is eliminated. Elimination of this ridge eliminates a significant obstruction to circulatory flow of the coagulated mass. Once initial slow circulatory movement is attained, the rotational speed of the agitator panels is increased, to say 4 to 5 rpm, and cutting of the mass is commenced.

A most important aspect to the present invention is the elimination of through-shafts for the rotating agitator panels and the radial offset of the innermost blade 36 which allows the close spacing of the two axes 12 and the overlap of the outer edge of one agitator panel into the space along the rotational axis of the other, once during each revolution. Furthermore, the divergent orientation of the outwardly extending blades 31 in each of the blade groups 34 results in a cross-cutting of the coagulated mass as one agitator panel rotates downwardly through the mass lying between the two axes 12 immediately after upward passage of the other agitator panel through that mass. Such cross-cutting significantly enhances the cutting efficiency and quality.

The foregoing construction also eliminates the inherently low velocity cutting regions adjacent the through-shafts of prior art constructions. Also eliminated are the essentially zero velocity regions on the shafts which permit a build-up of the material being processed.

The deflector plates 50 trail when the agitator panels 27 are being rotated in the cutting direction. Although the movement of the deflector plates through the mass of curds and whey is quite smooth in the cutting direction, the angled offset face portions 51 nevertheless contact the coagulated mass and provide beneficial movement of the mass in both the radial and axial directions. This enhanced movement is particularly important to eliminate tracking of the cutting blades 30 through essentially the same cuts in succeeding revolutions. If tracking occurs, the mass will tend to be cut into narrow slivers instead of the larger and more desirable cubical masses. When rotation of the agitator panels is reversed for stirring, the deflector plates 50 also provide the same dual direction flow in both radial and axial directions to better enhance the uniformity of the cut mass. The cheese is also typically heated during stirring and the unique angled orientation of the deflector plates assists greatly in removing the warmer mass from the heated side walls of the vat and replacing it with cooler mass from the interior.

Substantially the entire vat is enclosed by an outer wall 54 which defines with the compound frustoconical wall portions 11, the end walls 13 and the lower wall 15 a heating and cooling jacket 55. The upper wall 14 is not enclosed by the outer wall 54 and this unjacketed area is generally above the level of the liquid and semi-liquid materials being processed. The heating and cooling jacket 55 may be supplied with a cooling fluid, hot water or steam and, by substantially enclosing the entire vat in the heating and cooling jacket 55, combined with the unique radial and axial flow induced by the angled deflector plates 50, most effective and efficient cooking of the cheese mass or other temperature control may be attained. Furthermore, the jacket portions adjacent the end walls 13 may be separated from the jacket portions surrounding the wall portions 11, so they may be separately supplied with heating or cooling fluid to provide even greater selectivity in the control of temperature.

The drive mechanism 26 includes an electric motor 56 driving a reducer 57 which, in turn, is coupled to the right angle gear boxes 46 for the stub shafts 45. In addition to the usual variable speed rotation of the agitator panels in the cutting and stirring directions, the drive mechanism 26 may be operated to provide a reciprocal or oscillating agitator panel movement to enhance intermediate draw-off of whey during the processing. In particular, the agitator panels may be driven to oscillate through acute angles below the horizontal just sufficient to prevent the mass from matting while surface liquid is drawn off. A strainer apparatus 58 may be operatively attached to the upper wall 14 of the vat to be lowered below the upper level 60 of the whey, while the agitator panels 27 are stationary or are being oscillated in the lower portion of the vat, to permit whey to be drawn off while excluding solids.

It has also been found that a combination of oscillating panel movement and full rotational panel movement may be advantageously utilized, particularly when the liquid-solids mixture is being withdrawn from the vat via the drain outlet 23 in the bottom wall 15. In many processing systems, it is important that the ratio of solids to liquid in the cheese product being withdrawn from the vat be maintained as nearly constant as possible for continuing downstream processing. One way of assuring a constant ratio is to continue to stir the contents during discharge. Such stirring can be accomplished either by full rotational movement of the agitator panels or by the above described oscillatory movement. In some cases, a combination of full rotational panel movement and oscillatory panel movement may be advantageously utilized. For example, during the initial stages of product discharge while the solids-liquid level in the vat is relatively high, full rotational panel movement may provide the most advantageous stirring. As the level drops, however, the inclusion of oscillatory panel movements, particularly through rotational arcs near the bottom of the vat and beneath the descending level of the vat contents, may provide optimum stirring.

Referring to FIGS. 4 and 10, the drive connection between the second hub 43 of each agitator panel 27 and the stub shaft 45 of the gear box must necessarily pass through the end wall 13 of the vat and, as a result, the interface is sealed with the rotary seal 44. The peripheral edge of a circular opening in the end wall 13 is secured, as by welding, to an annular retaining flange 61. The retaining flange 61 surrounds the hub 43 and includes an inner shoulder 62 adapted to receive a flexible annular seal 63. The seal 63 is captured and held in a recess formed by the shoulder 62 and the face of an annular cover flange 64. The cover flange is attached to the retaining flange 61 with a series of circumferentially spaced bolts 65 and associated washers 66 (only one set of which is shown). A pair of 0-rings 67 positioned in suitable annular grooves in the respective flanges 61 and 64 help seal the annular seal 63 against peripheral by-pass of liquid and help to maintain the seal with misalignment in the hub 43 as it rotates. The rotary contact surface of the main annular seal 63 includes a flexible lip 68 and a heel 70.

In an alternate construction, one of the blade groups 34 of the agitator panel may be positioned rotationally 180° from its position in a panel 27 of the preferred embodiment. This would create a sort of crank configuration to the agitator panels which might be desirable for certain types of processing. A central strut or similar support to provide rotational support between the hubs 41 and 43 might extend from one or more interior wall portions between the offset blade groups.

I claim:

1. In a food processing vat having a pair of interconnected curved wall portions having horizontally disposed axes, the axes of the curved wall portions positioned in parallel horizontally spaced relation, and common upper and lower walls and opposite end walls forming with the curved wall portions an enclosed vat having a generally oval cross section in a plane perpendicular to said axes, the improvement comprising:

an open-framed agitator panel rotatably mounted on the axis of each wall portion to sweep a volume corresponding generally to said wall portion, each of said panels having a radially outer edge portion positioned to move along and closely adjacent a curved wall portion, and a radially inner edge portion generally parallel to said outer edge portion and spaced radially from the axis of panel rotation;

the axes of rotation of the panels being spaced at a distance less than the radius of the volumes swept by the panels to provide an overlap in the volumes swept by the respective panels and to allow the radially outer edge portion of one panel to pass during rotation through the space between the radially inner edge portion of the other panel and the axis of rotation of said other panel; and, each agitator panel defining a framework of intersecting cutting edges, including outwardly extending edges disposed at angles with respect to the axis of panel rotation greater than about 45° and less than 90° and longitudinally extending edges disposed at angles with respect to said axis less than about 45°.

2. In a food processing vat having a pair of interconnected curved wall portions having horizontally disposed axes, the axes of the curved wall portions positioned in parallel horizontally spaced relation, and common upper and lower walls and opposite end walls forming with the curved wall portions an enclosed vat having a generally oval cross section in a plane perpendicular to said axes, the improvement comprising:

an open-framed agitator panel rotatably mounted on the axis of each wall portion to sweep a volume corresponding generally to said wall portion, each of said panels having a radially outer edge portion positioned to move along and closely adjacent a cylindrical wall portion, and a radially inner edge portion generally parallel to said outer edge portion and spaced radially from the axis of panel rotation;

the axes of rotation of the panels being spaced at a distance less than the radius of the volumes swept by the panels to provide an overlap in the volumes swept by the respective panels and to allow the radially outer edge portion of one panel to pass during rotation through the space between the radially inner edge portion of the other panel and the axis of rotation of said other panel; and, each agitator panel defining a framework of intersecting cutting blades which blades are neither parallel to nor perpendicular to the axis of panel rotation.

3. The apparatus as set forth in claim 2 wherein certain of said cutting blades are positioned, with respect to the axis of panel rotation, to extend generally outwardly, and others of said cutting blades are positioned to extend generally longitudinally with respect to said axis.

4. The apparatus as set forth in claim 3 wherein said outwardly extending blades and said longitudinally extending blades are mutually non-perpendicular.

5. The apparatus as set forth in claim 2 comprising:

a drain outlet generally centrally positioned in the bottom center of the vat lower wall for removal of a liquid-solids mixture contained therein; and, a drive mechanism operatively connected to the agitator panels to selectively rotate both panels simultaneously to provide a combination of continuing full rotational movements and oscillating partial rotational movements through arcs of rotation below the level of the liquid-solids mixture.

* * * * *